3,076,828
11-OXYGENATED-14α-HYDROXY-9α-HALOGEN-PREGNENES

Albert Wettstein and Ernst Vischer, Basel, and Charles Meystre, Arlesheim, Switzerland, assignors to Ciba Corporation, a corporation of Delaware
No Drawing. Filed Sept. 26, 1956, Ser. No. 612,120
Claims priority, application Switzerland Sept. 30, 1955
6 Claims. (Cl. 260—397.45)

This invention provides Δ⁴-11-oxygenated 14α-hydroxy 9α-halogen-pregnenes and functional derivatives thereof.

The compounds unsubstituted in 21-position are more powerful than progesterone in transforming the vaginal epithelium into mucus cells in the presence of estrone and therefore can be used therapeutically in those illnesses where progesterone is indicated.

The compounds with oxygen in 21-position have cortical hormone activity; they may be used in the alleviation of symptoms associated with rheumatic and arthritic diseases.

The invention also provides a process for making the above new Δ⁴-14-hydroxy-pregnenes, wherein an 11-oxygenated 14-unsubstituted Δ⁴-9α-halogen-pregnene is subjected to the aerobic action of an enzyme produced by fungi of the genera Mucor, Helicostylum, Pleospora or Curvularia.

The 11-oxygenated 14-unsubstituted Δ⁴-9α-halogen-, especially-9α-fluoro- and 9α-chloro-pregnenes advantageously contain in the 3- and 20-positions free or functionally converted hydroxyl or oxo groups. They may contain further double bonds, for example, in the 1-, 6-, 7- or 16-position, or may contain additional substituents, such as free or converted hydroxyl or oxo groups, and also epoxy groups or halogen atoms, for example, in the 2-, 4-, 6-, 7-, 8-, 15-, 16-, 17- or 21-position, or methyl groups, for example, in the 17α-position. The aforesaid starting materials may be of any desired steric configuration and may be used in the form of racemates. They also include those of the so-called nor- and/or homo-series, especially 19-nor- and D-homo-compounds. Especially important starting materials are, for example, 9α-fluoro-and 9α-chloro-derivatives of hydrocortisone, cortisone, corticosterone, 11-dehydrocorticosterone, corresponding 1-dehydro- and 21-oxo-compounds, such as the 9αfluoro- and 9α-chloro-derivatives of 1-dehydro-hydrocortisone, 1-dehydro-cortisone, 1-dehydrocorticosterone, 1:11-bisdehydro-corticosterone, 11-hydroxy- and 11-oxo-progesterone, 11β-hydroxy- and 11-oxo-17α-hydroxy-progesterone, 1-dehydro-11β-hydroxy- and 11-oxo-progesterone, 1-dehydro-11:17α-dihydroxy- and -11-oxo-17α-hydroxy-progesterone. In the starting materials the functionally converted hydroxyl group may be, for example, a hydroxyl group esterified with an aliphatic, aromatic or heterocyclic carboxylic acid, for example, acetic acid, propionic acid, benzoic acid or furane carboxylic acid, or an etherified hydroxyl group, for example, the tetrahydropyranyl-oxy-, benzyloxy- or triphenylmethoxy-group. The functionally converted oxo group is advantageously a ketalized oxo group derived, more especially, from a dihydric alcohol such as the ethylene-dioxy group.

The aforesaid starting materials are reacted in the process of the invention with enzymes produced by fungi of the genus Mucor, Helicostylum, Pleospora or Curvularia, especially the species *Mucor griseocyanus, Mucor parasiticus, Helicostylum piriforme, Pleospora gaeumanni* and *Curvularia pallescens*. For cultivating these organisms known methods may be used, for example, those using sugars such as glucose or lactose, peptones, corn steep liquor, soya bean products or the like, and also mineral salts, or synthetic nutrient solutions. It is especially advantageous to work under aerobic conditions, for example, in an agitated culture, or with submerged growth while stirring and with the access of air. The aforesaid moulds differ from other micro-organisms, for example, bacteria, by growing well under relatively simple conditions of culture. The process of the invention can be carried out in the mould cultures described above or with the enzyme contained therein after being separated or, if desired, concentrated, and in the simplest case in a suspension of the separated mould mycelium or of the homogenized mould mycelium or in a filtrate or aqueous extract therefrom.

The products of the process can be isolated, for example, by extracting the reaction mixture with an organic solvent, for example, methylene chloride or ethyl acetate. For further purification of the extract so obtained chromatography is especially suitable, for example, over aluminum oxide or silica gel, or distribution methods may be used, for example, the counter-current method, or separation may be carried out by means of Girard reagents, such as trimethylammonium- or pyridinium-acetic acid hydrazide. Instead of or in addition to the purification, recrystallization from an organic or aqueous-organic solvent may be carried out.

By introducing the 14-hydroxyl group there are obtained valuable 11-oxygenated Δ⁴-14-hydroxy-9α-halogen-pregnenes and derivatives thereof, which, as compared with the therapeutically active compounds not hydroxylated in the 14-position, are distinguished by their greater activity. By oxygenated compounds and functional derivatives thereof there are to be understood those which contain free or functionally converted hydroxyl or oxo groups such, for example, as esters, ethers, thioesters, thioethers, thio- or thion-esters, acetals, mercaptals, ketals, enol derivatives such as enol-esters, enol-ethers or enamines, and hydrazones, semicarbazones and the like. Among the products of the process there may be mentioned, more especially, the 9α-fluoro- and 9α-chloro-derivatives of 14α-hydroxy-hydrocortisone, 14α-hydroxycortisone, 14α-hydroxy-corticosterone, 14α-hydroxy-11-dehydro-corticosterone, 14α-hydroxy-1-dehydro-hydrocortisone, 14α-hydroxy-1-dehydro-cortisone, 14α-hydroxy-1-dehydro-corticosterone, 14α-hydroxy-1:11-bisdehydro-corticosterone, 14α:11β-dihydroxy- and 14α-hydroxy-11-oxo-progesterone, 14α:11β:17α-trihydroxy- and 14α:17α-dihydroxy-11-oxo-progesterone, 14α:11β-dihydroxy- and 14α - hydroxy - 11 - oxo - 1 - dehydroprogesterone, 14α:11β:17α-trioxo- and 14α:17α-dihydroxy-11-oxo-1-dehydroprogesterone, and also corresponding functional derivatives thereof, such as esters or ethers. When the products of the process do not possess the configuration and substituents of steroids useful for therapeutic purposes, they can be used as intermediate products for the manufacture, for example, of the above mentioned compounds.

The reaction products obtained by the process of the invention may be converted by methods in themselves known into their functional derivatives, such as oxygen, sulfur or nitrogen derivatives, for example, esters, ethers, enol-esters, enol-ethers, ketals, thioethers or thioketals, and also hydrazones, oximes or enamines, and hydroxyl groups may be dehydrogenated to form oxo groups. In these compounds the hydroxyl and/or oxo groups may be completely or partially functionally converted.

In the esters and enol-esters the acid radicals may be those of any desired organic or inorganic acids, such as aliphatic, alicyclic, araliphatic, aromatic or heterocyclic carboxylic acids, thion-carboxylic acids, thiol-carboxylic acids or sulfonic acids, advantageously formic acid, acetic acid, chloracetic acids, trifluoracetic acid, propionic acid, butyric acids, valeric acids, trimethyl-acetic acid, diethylacetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentyl-propionic acid, hexahydrobenzoic acid, benzoic acid, phenylacetic acid, cyclohexylacetic acid, phenyl propionic acids, trimethyl-gallic acid, phthalic acid, furane-2-carboxylic acid, isonicotinic acid, methane sulfonic acid, toluene sulfonic acid, sulfuric acids, hydrohalic acids or phosphoric acids.

If desired, functionally converted hydroxyl or oxo groups present in the compounds so obtained may be converted into free groups. In this manner, especially in polysubstituted derivatives the functionally converted groups may be only partially liberated. This may be brought about, for example, by chemical or enzymatic hydrolysis, for example, with the use of acid or basic agents, by re-esterification or reacetalization. From the only partially converted, such as esterified or etherified, derivatives obtained in this manner or obtained directly polysubstituted derivatives, especially mixed esters or ethers or ester-ethers, can be produced by subsequent functional conversion, for example, esterification or etherification. If, during the hydrolysis, especially when carried out with an alkaline agent, the 9:11-halogen hydrin is converted into the corresponding 9:11-oxido-compound, the latter can be reconverted into the desired 9:11-halogen hydrin by reaction with a hydrohalic acid, especially hydrofluoric acid or hydrochloric acid.

The products of the invention are useful as medicaments or as intermediate products for making medicaments.

The following examples illustrate the invention:

Example 1

A solution of 125 milligrams of $\Delta^4$-3:20-dioxo-9α-fluoro-11β:17α:21-trihydroxy-pregnene in 10 cc. of acetone is added under sterile conditions to an agitation culture, which has been well developed at 28° C. and is four days old, of *Pleospora gaeumanni* in 500 cc. of aqueous beer wort of 70 percent strength containing 0.5 cc. of sperm oil. The suspension is agitated for 4 days at the same temperature. The mycelium is then separated and washed well with water and ethyl acetate. The combined clear solutions are extractd with ethyl acetate. The ethyl acetate solutions are washed with water, dried and evaporated in vacuo. The residue is dissolved in methanol of 80 percent strength, and then extracted several times with petroleum ether. The methanol solutions are then completely evaporated in vacuo. A paper chromatogram (mixture of propylene glycol and toluene) of the residue exhibits, in addition to a small amount of $\Delta^4$-3:20-dioxo-9α-fluoro-11β:17α:21 - trihydroxy - pregnene, the somewhat slower running $\Delta^4$-3:20-dioxo-9α-fluoro-11β:14α:17α:21-tertrahydroxy-pregnene. The entire residue is split up by means of a preparative paper chromatogram (mixture of propylene glycol and toluene). The zones corresponding to the 14α-hydroxy-derivative are cut out and extracted several times with methanol of 50 percent strength. The methanol is then removed in vacuo, the residual aqueous solution is extracted several times with ethyl acetate, the combined ethyl acetate solutions are washed with water, dried and evaporated, and pure $\Delta^4$-3:20-dioxo-9α-fluoro - 11β:14α:17α:21 - tetrahydroxy-pregnene remains behind as a residue.

The incubation of the $\Delta^4$-3:20-dioxo-9α-fluoro-11β:17α:21-trihydroxy-pregnene may be carried out in 500 cc. of a well developed aqueous culture of *Curvularia pallescens*, which contains the following additions: 5 grams of cane sugar, 5 grams of Difco-tryptone, 1 gram of sodium nitrate, 0.5 gram of secondary potassium orthophosphate, 0.25 gram of sodium sulfate, 0.25 gram of potassium chloride, 5 milligrams of iron sulfate heptahydrate, 1.25 grams of potassium carbonate and 0.5 cc. of sperm oil. The further treatment is as described above.

$\Delta^4$-3:20-dioxo-9α-fluoro-11β:14α:17α:21-tetrahydroxy-pregnene can be acetylated as follows: 100 milligrams of this compound are mixed with 0.3 cc. of acetic anhydride and 3 drops of pyridine. The solution is allowed to stand for 15 hours at 20° C., then evaporated on the addition of water under ordinary vacuum and then completely dried under a high vacuum, and $\Delta^4$-3:20-dioxo-9α-fluoro-11β:14α:17α:21-tetrahydroxy-pregnene-21-acetate is obtained as a residue.

Example 2

A solution of 125 milligrams of $\Delta^{1,4}$-3:20-dioxo-9α-fluoro-11β:17α:21-trihydroxy-pregnadiene in 10 cc. of acetone is added under sterile conditions to an agitation culture, which is well developed at 28° C. and is 4 days old, of *Pleospora gaeumanni* in 500 cc. of aqueous beer wort of 70 per cent strength containing 0.5 cc. of sperm oil. The suspension is agitated for a further 4 days at the same temperature. The reaction mixture is worked up and the resulting $\Delta^{1,4}$-3:20-dioxo-9α-fluoro-11β:14α:17α:21-tetrahydroxy-pregnadiene is isolated and purified as described in Example 1.

The 11β:14α:17α:21 - tetrahydroxy - derivative so obtained travels more slowly in a paper chromatogram (mixture of propylene glycol and toluene) than $\Delta^{1,4}$-3:20-dioxo-9α-fluoro-11β:17α:21-trihydroxy-pregnadiene.

$\Delta^{1,4}$-3:20 - dioxo - 9α - fluoro - 11β:14α:17α:21-tetrahydroxy-pregnadiene can be acetylated in the manner described in Example 1 to yield $\Delta^{1,4}$-3:20-dioxo-9α-fluoro-11β:14α:17α:21-tetrahydroxy-pregnadiene-21-acetate.

Example 3

$\Delta^4$-3:11:20-trioxo-9α-fluoro-pregnene is incubated under the conditions given above and is worked up and purified in an analogous manner to yield $\Delta^4$-3:11:20-trioxo-9α-fluoro-14α-hydroxy-pregnene, which travels in a paper chromatogram (mixture of formamide, cyclohexane and benzene [1:1]) somewhat more slowly than $\Delta^4$-3:11:20-trioxo-9α-fluoro-pregnene.

What is claimed is:

1. A compound of the formula

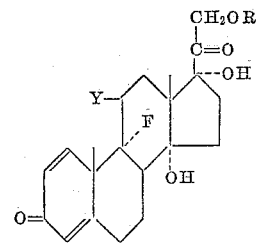

wherein Y is selected from the group consisting of keto and β-hydroxy, and R is selected from the group consisting of hydrogen and lower alkanoyl.

2. A compound selected from the group consisting of steroids of the formula

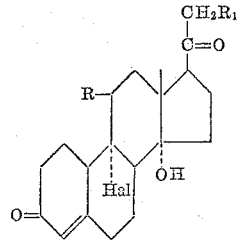

wherein Hal is a member selected from the group consisting of fluorine and chlorine, R is a member selected from the group consisting of β-hydroxy and oxo groups and $R_1$ is a member selected from the group consisting of hydrogen, hydroxy and acyloxy said acyloxy having 1 to 10 carbon atoms, and 1-dehydro derivatives thereof.

3. $\Delta^{1,4}$-3,20-dioxo-9α-fluoro - 11β,14α,17α,21 - tetrahydroxy-pregnadiene.

4. The 21-acetate of the compound of claim 3.

5. The 21-acyloxy derivative of the compound of claim 3, said acyloxy group having from 1 to 10 carbon atoms.

6. $\Delta^4$-3,11,20-trioxo-9$\alpha$-fluoro-14$\alpha$-hydroxy-pregnene.

References Cited in the file of this patent

UNITED STATES PATENTS

| | | |
|---|---|---|
| 2,602,769 | Murray | July 8, 1952 |
| 2,649,401 | Haines | Aug. 18, 1953 |
| 2,688,030 | McNiven | Aug. 31, 1954 |
| 2,773,076 | Reichstein | Dec. 4, 1956 |
| 2,783,226 | Gould et al. | Feb. 26, 1957 |
| 2,800,489 | Reichstein | July 23, 1957 |
| 2,837,464 | Nobile | June 3, 1958 |
| 2,837,541 | Hirschmann et al. | June 3, 1958 |
| 2,854,383 | Herzog | Sept. 30, 1958 |
| 2,864,835 | Gould et al. | Dec. 16, 1958 |
| 2,891,080 | Bloom et al. | June 16, 1959 |